United States Patent [19]

Taubitz

[11] Patent Number: 4,850,634
[45] Date of Patent: Jul. 25, 1989

[54] FOLDING TOP FOR CROSS-COUNTRY VEHICLES

[75] Inventor: Kurt Taubitz, Töging, Fed. Rep. of Germany

[73] Assignee: Gebr. Haslbeck GmbH, Mühldorf, Fed. Rep. of Germany

[21] Appl. No.: 74,771

[22] Filed: Jul. 17, 1987

[30] Foreign Application Priority Data

Sep. 22, 1986 [DE] Fed. Rep. of Germany ... 8625322[U]

[51] Int. Cl.⁴ .............................................. B60J 7/12
[52] U.S. Cl. .................................. 296/107; 296/121; 296/122
[58] Field of Search ............... 296/105, 107, 108, 109, 296/121, 122, 186, 219

[56] References Cited

U.S. PATENT DOCUMENTS

| | | | |
|---|---|---|---|
| 727,492 | 5/1903 | Temple et al. | 296/107 |
| 760,928 | 5/1904 | Shipley | 296/107 |
| 801,481 | 10/1905 | Shipley | 296/107 |
| 1,016,653 | 2/1912 | Steinbrenner | 296/121 |
| 1,121,553 | 12/1914 | Dorl | 296/121 X |
| 1,127,099 | 2/1915 | Shipley | 296/121 X |
| 3,476,437 | 11/1969 | Schroeder et al. | 296/107 X |
| 3,819,227 | 6/1974 | Carli | 296/219 |

FOREIGN PATENT DOCUMENTS

| | | | |
|---|---|---|---|
| 1755688 | 12/1971 | Fed. Rep. of Germany | 296/186 |
| 449689 | 3/1913 | France | 296/107 |
| 2557040 | 6/1985 | France | 296/107 |
| 134506 | 7/1929 | Switzerland | 296/107 |

Primary Examiner—Dennis H. Pedder
Attorney, Agent, or Firm—Oblon, Spivak, McClelland, Maier & Neustadt

[57] ABSTRACT

A folding top in a cross-country vehicle includes front struts pivotally connected to opposite sides of a vehicle and mutually connected by a front cross tube, rear struts, each formed of flexibly connected rear strut sections, the rear struts being pivotably connected to the opposite sides of the vehicle and being mutually connected by a rear cross tube, and lateral struts flexibly connected to corresponding ones of the front and rear struts at positions adjacent connections of the front and rear struts to the front and rear cross tubes, respectively, the lateral struts each including mutually articulated front and rear lateral strut sections. Retainers constituting a latching device can be positioned between the strut sections of the rear and lateral struts. A tarpaulin top fitted on the struts includes portions which can be zippered closed relative to one another.

11 Claims, 7 Drawing Sheets

FOLDING TOP FOR CROSS-COUNTRY VEHICLES

BACKGROUND OF THE INVENTION

1. Field of the Invention:

This invention relates to a folding top for cross-country vehicles with front and rear stretching frames, formed in each case from a pair of front and rear side struts, which are placed in a swinging manner on the body and on their free end are each connected by a cross rod spanning the vehicle width, for the support of a tarpaulin forming the top.

2. Discussion of Background Art:

Known folding tops of cross-country vehicles have the disadvantage that their side struts in the closed condition of the top are placed in the vision area of the side windows and, as a result, aside from the reduced vision conditions, they exhibit abrasive surfaces and a certain danger of injury for the passengers.

As a rule the known tops can only be either completely unfolded or alternatively only the rear tarpaulin rolled up, while the side surfaces of the top remain closed. But this means that the possibilities of opening the known folding tops are limited. Moreover, the process of opening the known tops takes about 5 to 10 minutes, since manipulation of the individual mechanisms of the support device for the tarpaulin is complicated and time-consuming.

SUMMARY OF THE INVENTION

As it is preferable to vary the opening possibilities of a folding top and to perform top opening with few simple manipulations in a short time, the object of the invention is to provide a folding top which allows simple and fast manipulation and in addition allows variable opening positions.

This is achieved according to the invention by the fact that upper lateral struts, running in the longitudinal direction of the vehicle, are flexibly mounted in the area of the connection of the ends of the front and rear struts to cross rods, and that the lateral and rear struts in each case are formed from strut sections flexibly connected to one another.

As a result of the arrangement and design according to the invention of the struts serving for support of the top tarpaulin, the vision area of the windows is fully preserved. By avoiding side vertical struts in the case of the closed top, a danger of bumping or abrasion for the passengers is also avoided. By the articulated joints provided between the various strut sections, the articulation paths are necessarily predetermined so that a simple manipulation for the opening and closing process results.

Since according to a preferred embodiment of the folding top, retainers are provided for locking the strut sections in the desired angular position, at least one retainer being designed as a latching device, which in its one position (locking position) automatically locks in a predetermined angular position the two strut sections which are flexibly connected to one another, and in its other position (movement position) allows an angular movement of the strut section relative to one another, in the case of outbreak of bad weather the open folding top can be closed unusually quickly.

Since for the fastening of the folding top according to the invention sockets or latching devices usually already present on the cross-country vehicle are used, changing over of the usual cross-country vehicle for mounting of the folding top according to the invention is possible with relatively simple means, without starting points for rust attack being made by additional bores in the outside area of the body.

Since in a further preferred design of the folding top according to the invention the dimensions of the strut sections are so matched to one another that in the folded-up condition the lateral side strut sections are brought nearer to one another in an acute angle, run approximately adjacent to the rear wall of the rear seats, while the central cross rod lies approximately horizontal and behind the rear seat on the vehicle floor. In the case of an open top an optimal vision area and a barely reduced standing room are also obtained, without the passengers being disturbed by the rods of the top. The tarpaulin for the folding top, also forming the object of the invention, is so made that the side edges of the roof tarpaulin and of the rear tarpaulin are each connected by a zipper to the edges of the side tarpaulins forming the side surfaces.

As a result, the maximum possible number of opening positions of the top is provided. Thus, for example, it is possible not only, as in the usual tops, to roll up the roof tarpaulin but alternatively at the same time or even exclusively to roll up the side tarpaulins without having to operate the folding mechanism. But it is also possible to leave only the top that is above the driver's seat and by operating the folding mechanism of the rear folding top to open all of the top that is behind the driver's seat.

Since the top tarpaulin that is above the front seats is fastened completely independently of the roof, side and rear tarpaulins over the rear seats, these can be opened and closed independently of one another. Thus additional numerous opening combinations of the top result, all of which can be performed by simple manipulations, as for example by pulling of the adjustment knobs or by swinging of the adjusting lever and then necessarily putting the struts of the top into their preset angular positions.

As a result of the drive paths necessarily followed on the basis of the design according to the invention, an optimal riding comfort is provided, since it will no longer be preferred, as previously, to leave the top in its existing position to avoid complicated, time-consuming manipulations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
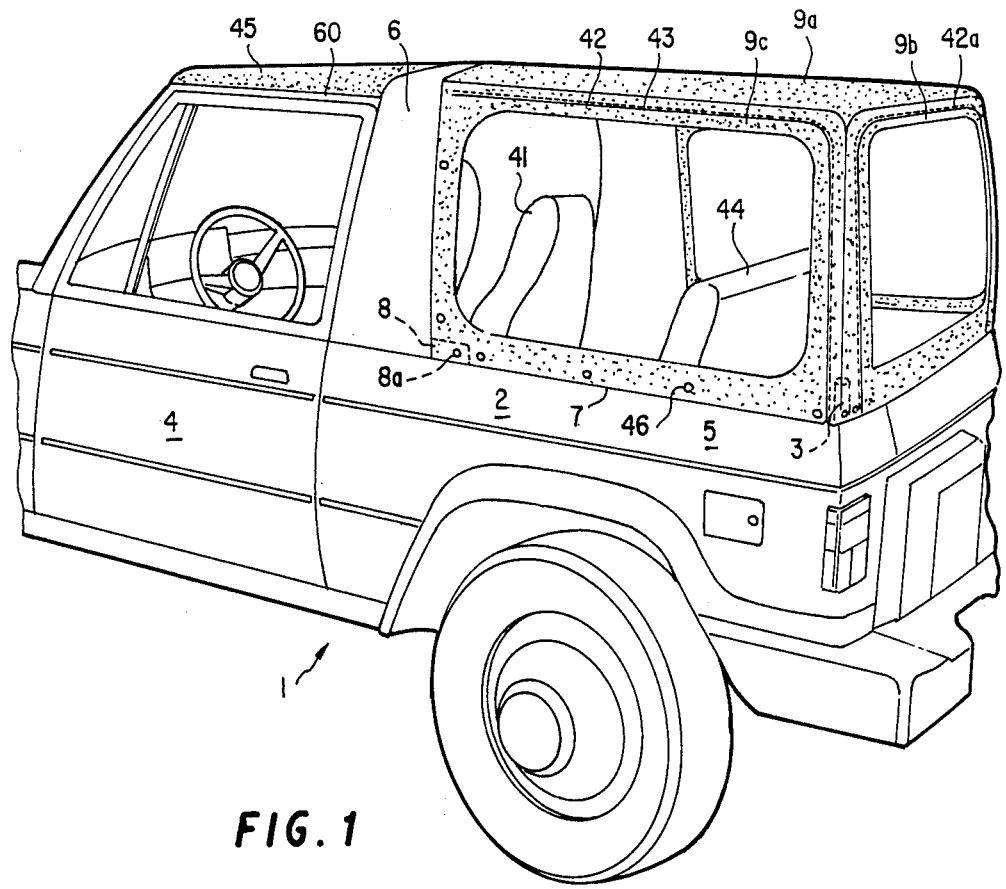
FIG. 1 is a perspective view of a cross-country vehicle with a closed folding top.

Sleeve 3 serving as plug connections for the rear rods of a folding top are located in the rear area of the side edges of a body 2 in a cross-country vehicle 1 for fastening of conventional top. In the immediate area of roll bar 6 located between vehicle door 4 and rear vehicle part 5, and on the upper edge of the side body, is placed a latching device 8 whose latch opening serves as a swiveling axis 8a for the front rods of the folding top.

Figure 2:
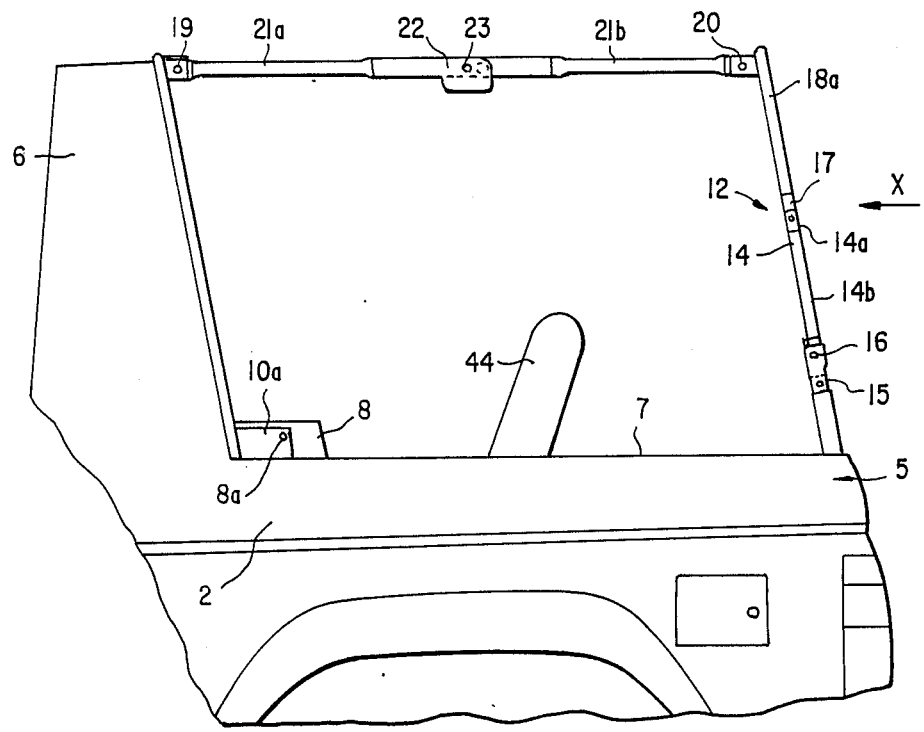
FIG. 2 is a side view of the rods of the closed top.
Figure 3:
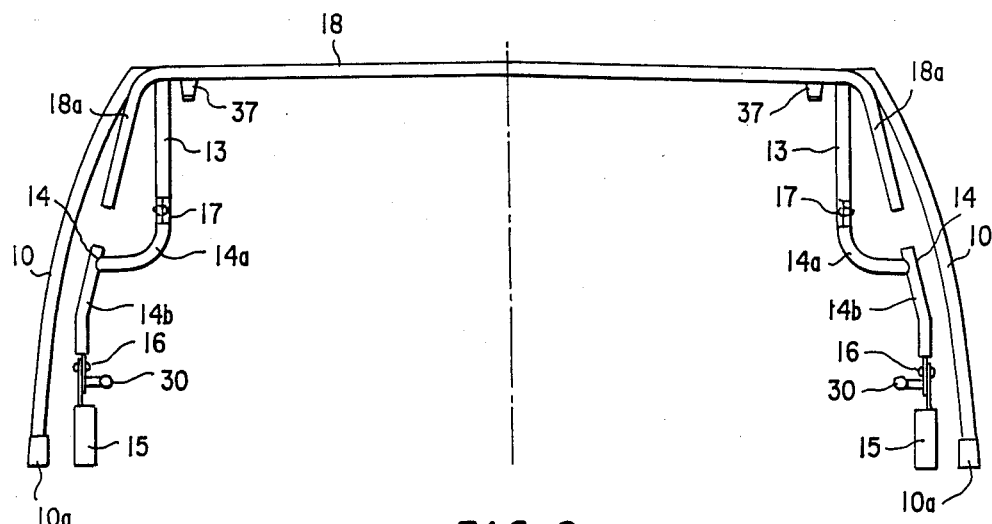
FIG. 3 is a view of the rods according to FIG. 2 corresponding to a direction of view according to arrow X.
Figure 4:
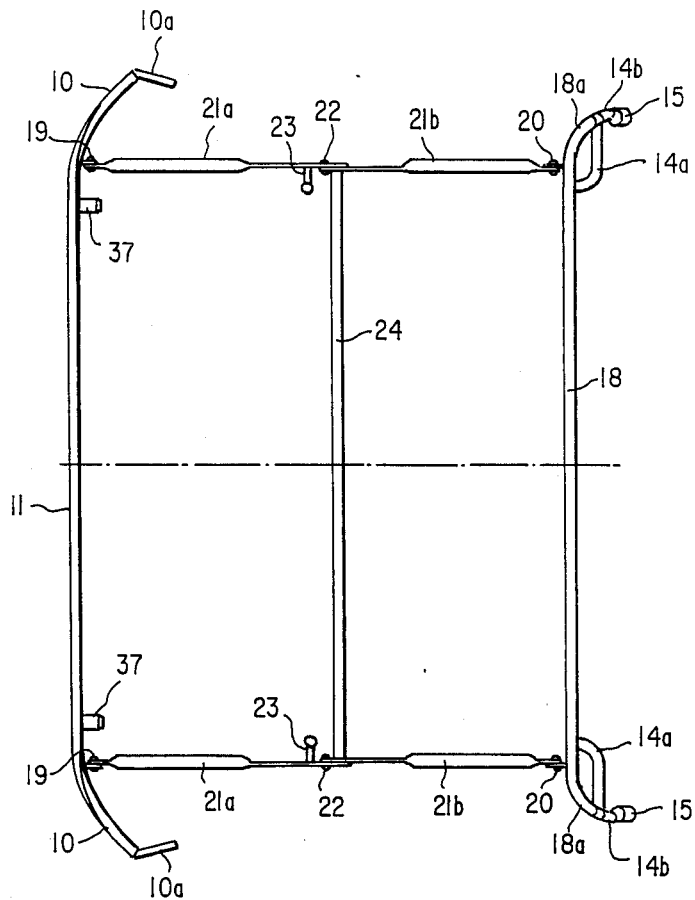
FIG. 4 is a top view of the rods according to FIG. 2.

Struts serving for support of the top tarpaulin formed from roof and rear tarpaulins 9a, 9b and two side tarpaulins 9c are shown in FIGS. 2 to 4. Two front side struts 10 have ends mounted in swiveling axis 8a of the latching device 8 by lug 10a provided on the lower end of each front side strut. The upper ends of side struts 10 are connected to one another by a cross tube 11 which extends crosswise over body 1. Rear side struts 12 are formed from three strut sections 13, 14 and 15. A lower strut section 15 is inserted in each sleeve 3. Each lower strut section is flexibly connected to a center strut section 14 by an articulated joint having a retainer 16, whose construction is described in detail below in connection with FIGS. 9 and 10; each upper strut section 13 is connected to a center strut section 14 by an articulation 17. Opposing upper strut sections 13 are also connected to one another by a cross tube 18 going across body 2.

It can be seen from FIG. 3 that center strut section 14 is formed from two tubular pieces 14a and 14b, which at their junction point run approximately at right angles to one another and are there welded to one another. Tubular piece 14a is curved. The end of tubular piece 14a connected to upper strut section 13 runs approximately parallel to tubular piece 14b but is inwardly offset. Cross tube 18 connecting upper strut sections 13 continues free on both sides beyond its junction points with strut sections 13. Its ends 18a are drawn downward so that they are approximately aligned with tubular piece 14b but end at a distance from the tubular piece, so that between tubular piece 14b and ends 18a of cross tube 18 a certain distance remains which allows swinging movements of tubular sections 13 and 14. Tubular sections 18a and 14b define the vehicle edges in the rear areas. In this connection strut sections 15 and 14b as well as cross tube 18 with its free ends 18a form the rear outside frame of the folding top. Strut sections 14a and 13 with the help of articulations 17 provided between them, and strut sections 15 and 14b with the help of articulated joints associated with retainer 16, can be swung relative to one another. An outward buckling during the folding process is prevented by a stop 17a on each articulation strut section 13. In this connection see especially FIGS. 5 and 6.

Articulated joints 19 and 20 are placed adjacent the junction points between front struts 10 and cross tube 11, as well as in the area of the junction points of cross tube 18 and upper strut sections 13. Lateral struts 21 which are formed from two lateral strut sections 21a and 21b are mounted to the articulated joints. Strut sections 21a and 21b are connected to one another by an articulation 22 provided with a retainer 23. Retainer 23 corresponds completely to retainer 16, which is inserted between strut sections 15 and 14 of the rear top frame. In the area of articulated joint 22 of lateral strut sections 21a and 21b is provided a central cross tube 24, running crosswise over body 2, which connects strut sections 21b running parallel to one another at positions on the body opposite to one another. This central cross tube 24 serves as a support for the top tarpaulin 9a to prevent its fluttering during travel.

By the above described struts or strut sections flexibly connected to one another and the three cross tubes 11, 18 and 24, placed in the area of the articulated joints 19, 20 and 22, a frame for the folding top is provided, whose angular position in the closed condition is fixed by the fastening devices provided on body 2, i.e., sleeves 3 and swiveling axes 8, 8a on the one hand, and by its connection with roll bar 6, on the other hand, as well as by the retainers 16 and 23.

Figure 9:
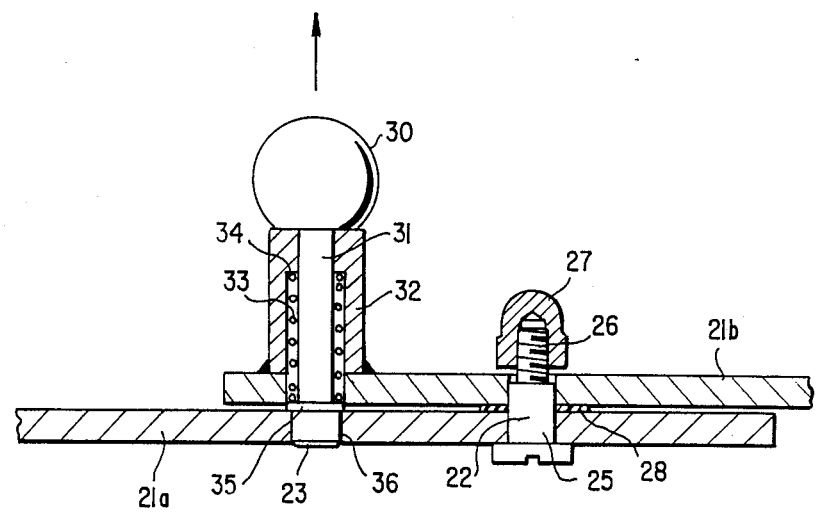
FIG. 9 is a sectional view through a retainer which connects two strut sections of the rods.
Figure 10:
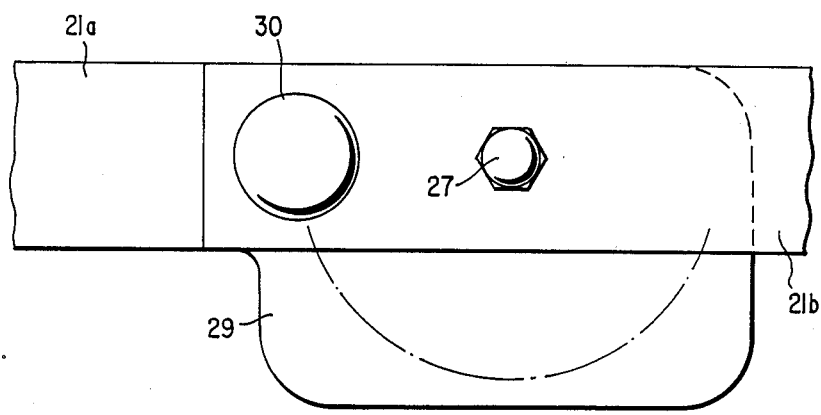
FIG. 10 is a top view of the retainer shown in FIG. 9.

The retainers 16 and 23 are identical. Retainer 23 is shown in FIG. 9

Strut sections 21a and 21b are flexibly connected to one another at articulated joint 22. The articulation axis is formed by a guide 25 going through both strut section 21a and 21b, the guide including a bolt 26 with a nut 27. A washer 28 lies between the overlapping ends of strut sections 21a and 21b.

The end of strut section 21a is broadened within the overlapping area of the two strut sections 21a and 21b in the form a lug 29.

In the area of the free end of strut section 21b, at a distance from articulated joint 22, a bolt 31 provided with an adjustment knob 30 is guided in a sliding manner in a sleeve 32. Bolt 31 is put under tension by a spring 33, which is supported on a shoulder 34 inside the sleeve and on a projecting offset 35 of bolt 31. As soon as the central longitudinal axis of bolt 31 is aligned with the central longitudinal axis of a bore 36 in strut section 31a, spring 33 can press the end of bolt 31 into bore 36. As a result, the positions of the two strut sections 21a and 21b are fixed in relation to one another so that their longitudinal axes are aligned with one another.

Bolt 31 under the tension of spring 33 can be removed from bore 36 by means of adjustment knob 30 to swing strut sections 21 and 21b, relative to one another, around articulated joint 22 and draw articulated joint 22 downward, i.e., toward body 2. In this case, the free end of bolt 31 slides along lug 29 (circular path indicated by broken line) and spring 33 constantly remains under tension. Struts 10 are simultaneously swung around swiveling axis 8a.

But a loosening of retainer 23 is to be performed only if the connection of front struts 10 and cross tube 11 connecting them with roll bar 6 has previously been loosened by hand.

Figure 11:
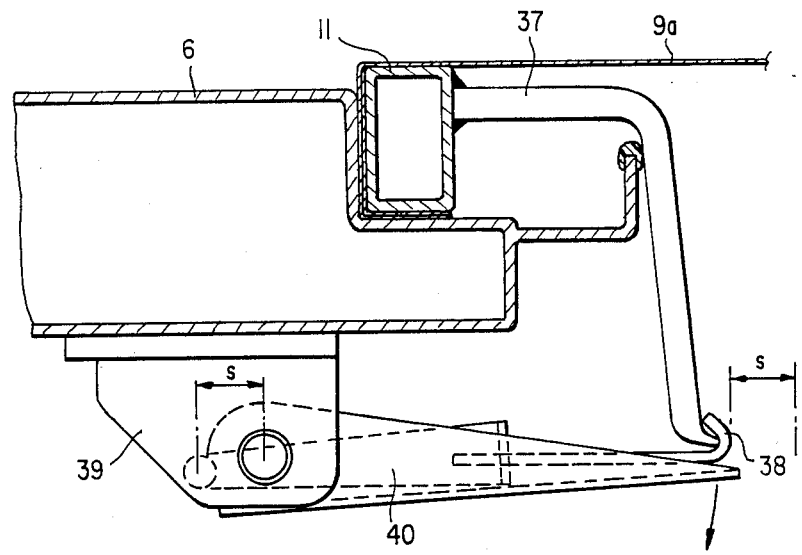
FIG. 11 is a side view of a clamping device for fastening of the struts of the folding top to the roll bar.

Projections 37 (FIG. 11) are placed on cross tube 11 for the fastening of front struts 10 to roll bar 6. Projections 37 are engaged by a hook 38 of a tension device 39 with a clamping lever 40, which is fastened to roll bar 6.

The folding process for opening of the folding top can begin only if retainer 16 between the rear strut sections which functions like retainer 23, is also loosened by hand by pulling its adjustment knob 30, so that strut sections 15 and 14 can be swung relative to one another and thus make possible a swinging movement of strut sections 14 and 13 about articulations 17 and 20.

Figure 5:
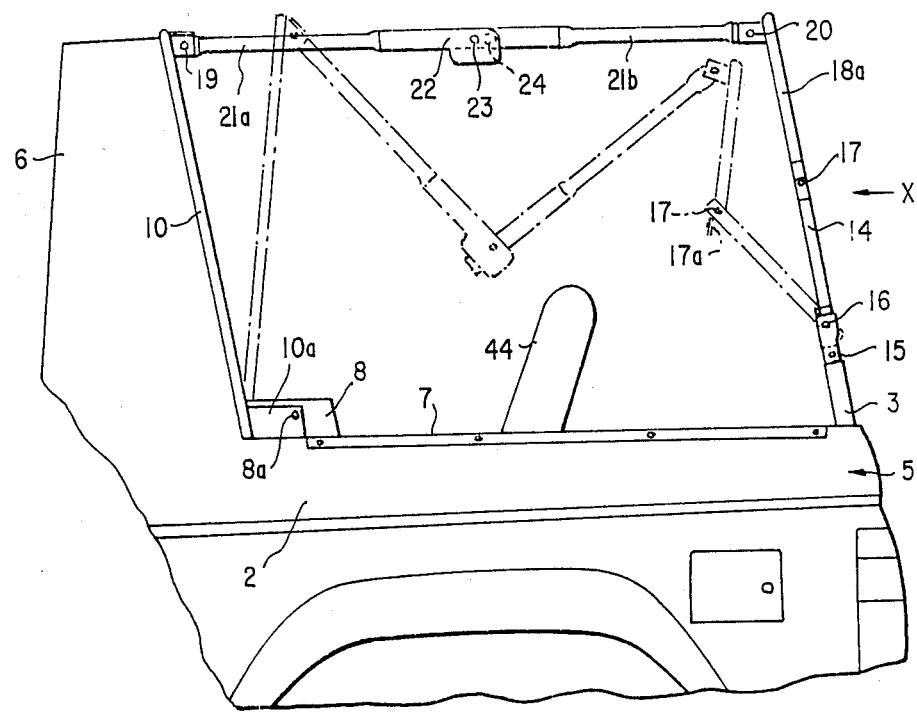
FIG. 5 is a side view of the rods according to FIG. 2 with partly folded-up rods indicated in broken lines.
Figure 6:
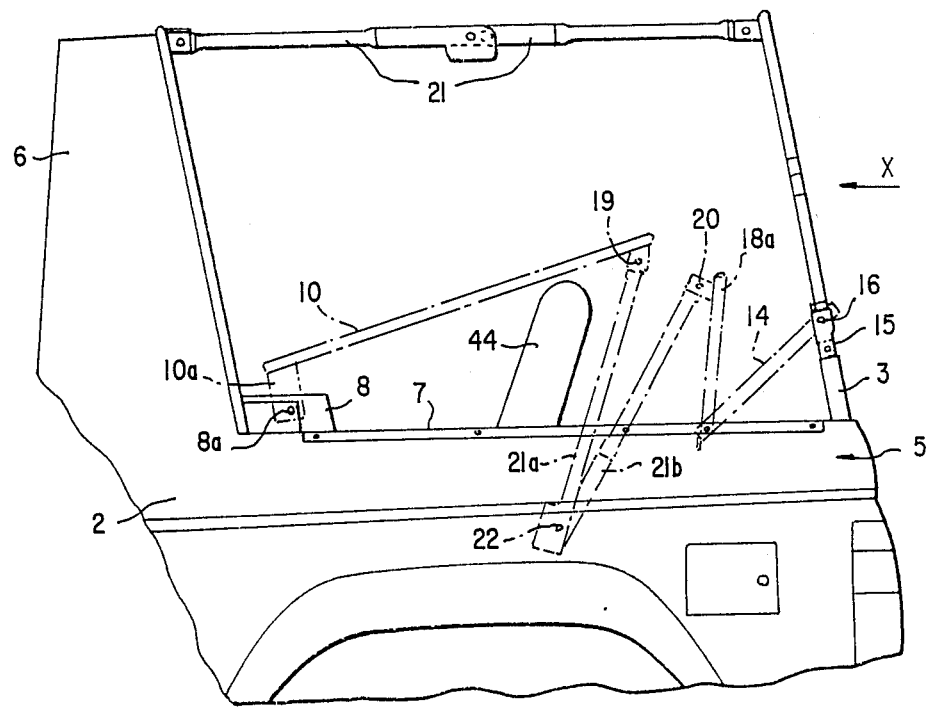
FIG. 6 is a side view of the rods according to FIG. 2 with completely folded-up rods indicated in broken lines.

The course of movement of the struts during the folding up of the closed folding top can be seen from FIGS. 5 and 6. The folding process is completed when the struts are in the angular position shown in FIG. 6. Here struts 21a rest on the rear wall of rear seat 44 of the vehicle, and struts 21b, connected with struts 21a, as well as struts 13, run at acute angles to one another. Central tube 24 then lies behind the rear seats 44 crosswise to the vehicle floor.

To unfold the folding top, which in closed condition is covered by roof, rear and side tarpaulins 9a, 9b and 9c, it is first necessary, as can be seen in FIG. 1, to open a zipper 42 or 42a, which separates each side tarpaulin 9c from roof tarpaulin 9a and rear tarpaulin 9b. In addition, button fastenings 46 along the lower edge of each side tarpaulin 9c must be unbuttoned. Subsequently, side tarpaulins 9c are rolled forward toward roll bar 6 and fastened there.

As can be seen from FIG. 1, each side tarpaulin 9c is provided along its edge with a VELCRO hook and loop fastening strip 43, which prevents a slipping of the individual plies of fabric of rolled-up side tarpaulin 9c against one another. A similar strip may be provided for the rear tarpaulin.

The VELCRO fastening strip 43 extends along the upper edge of each side tarpaulin 9c. The two contact strips necessary in the case of a VELCRO fastening strip are placed one on the outside and one on the inside surface of side tarpaulins 9c so that desired adhesive action of the fabric plies of side tarpaulins 9c is achieved, when side tarpaulins 9c are rolled up.

When the top is closed, the outside contact strip of VELCRO fastening strip 43 of side tarpaulin 9c engages a strip of roof tarpaulin 9a extended parallel to it, the strip of roof tarpaulin in this area being designed as a zipper cover.

Figure 7:
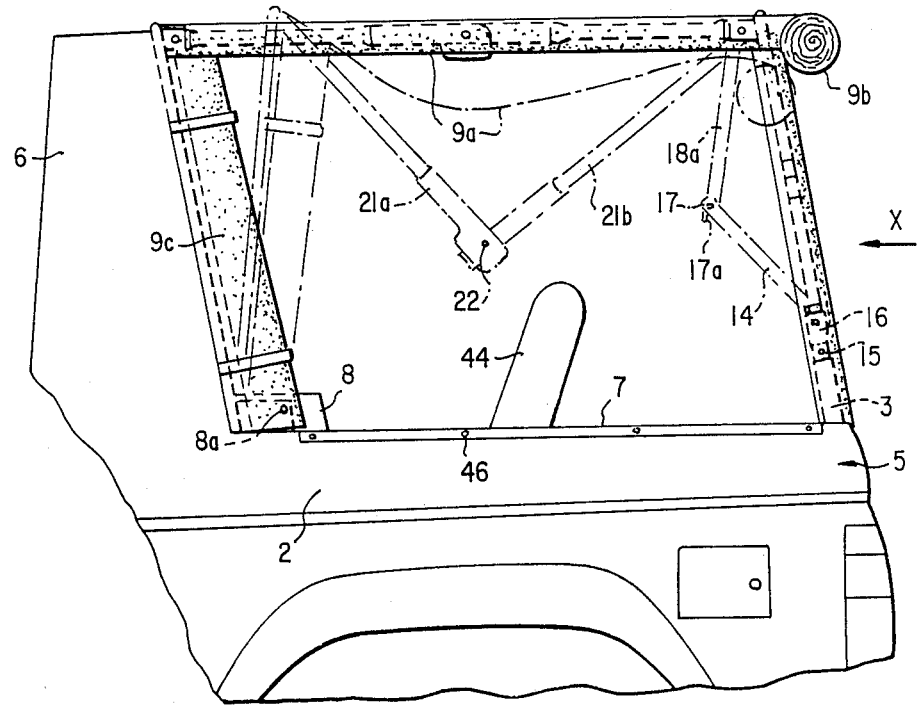
FIG. 7 is a side view of the rods according to FIG. 5 with rolled-up side and rear tarpaulins.
Figure 8:
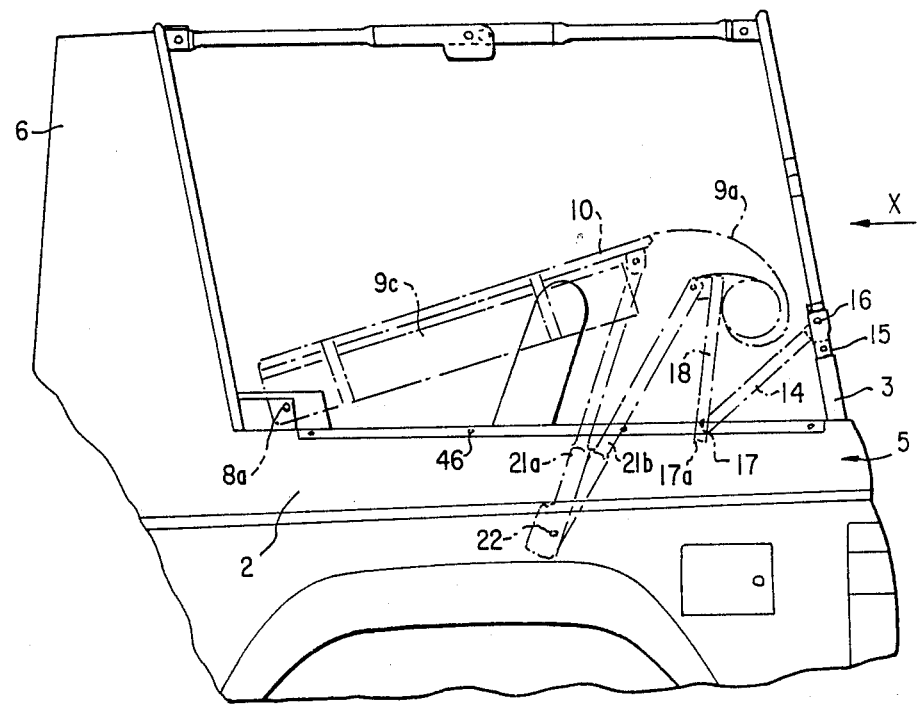
FIG. 8 is a view according to FIG. 6 with rolled-up side and rear tarpaulins as well as the roof tarpaulin in the open position of the folding top.

After zipper 42a has been opened, rear tarpaulin 9b covering the rear frame part formed from struts 13, 14, 15 and 18 is rolled up toward cross tube 18 and fastened to it. Tarpaulin section 9a, forming the roof area between cross tubes 18 and 11, is fastened with its front edge to cross tube 11 and with its rear edge to cross tube 18 in an undetachable manner, and to cross tube 24 in a detachable manner with VELCRO fastening strip. Before folding up, the VELCRO fastening strip must be loosened from cross tube 24. During folding up of the struts, this fabric area 9a hangs loose. At the completion of a folding operation, in other words in the case of the fully opened folding top, see FIG. 6, the fabric area 9a can be pulled over the fabric roll formed from rear tarpaulin 9b. See FIGS. 7 and 8.

Figure 12:
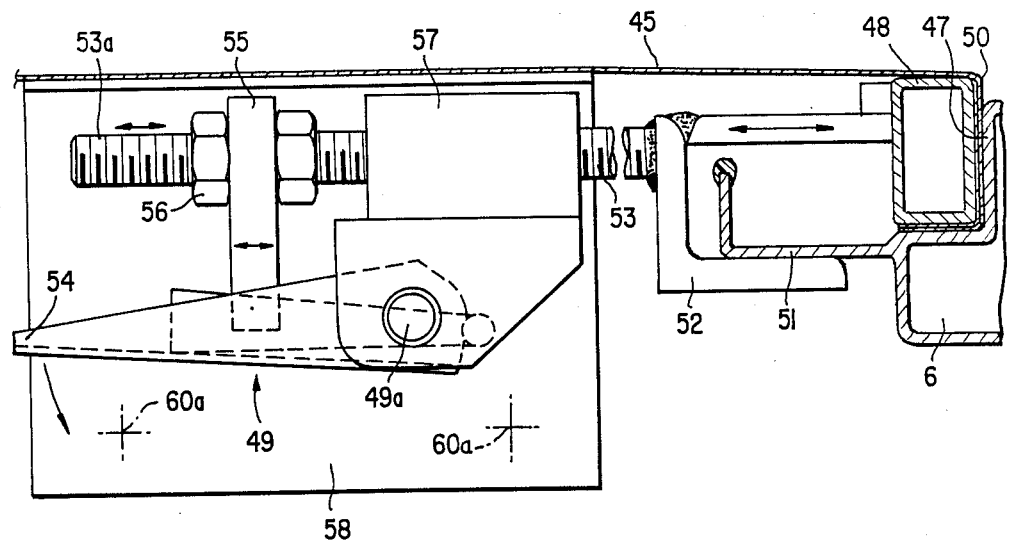
FIG. 12 is a side view of a clamping device for fastening of the roof tarpaulin above the driver's seat.

The top tarpaulin over front seats 41 is completely separate from the above described folding top. Top tarpaulin 45 is fastened along its three edges along the upper edges of body 2 by means of fastening devices originally on the vehicle. Only free rear edge 47 of top tarpaulin 45 ends on a cross tube 48, which is fastened with a clamping device 49, as shown in FIG. 12, on roll bar 6, by insertion of a sealing element 50.

For fastening of clamping device 49 to roll bar 6 there is projection on both sides of roll bar 6, which projects from roll bar 6 toward the vehicle front. Cross tube 48, designed as a square tube, together with the end of top tarpaulin 45, lies on projection 51, and seal 50 stretching over the entire length of square tube 48 is inserted between projection 51 and cross tube 48. Cross tube 48 is held in its position with the help of clamping element 52, designed as a U-shaped section, of clamping device 49. The U-shaped section is connected to a threaded pin 53, which is guided in a guide part 57. Free end 53a of threaded pin 53 penetrates a drive element 55 which, together with adjustable nuts 56, makes the clamping possible.

Guide part 57 is welded to a fastening part 58. Fastening part 58 in turn is screwed onto the vehicle spar 60 over the entrance doors with fastening bolts 60a.

Driver 55 is fastened to clamping device 49.

By the swinging of clamping lever 54 of clamping device 49, by a knee lever 49a, cross tube 48 with seal 50 is pressed on roll bar 6 or loosened from it.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Pat. of the U.S. is:

1. A folding top in a cross-country vehicle having a laterally extending roll bar, comprising:
   front struts pivotably connectable to opposite lateral sides of a vehicle and mutually connected at tops thereof by a front cross tube;
   rear struts, each formed of flexibly connected rear strut sections, said rear struts being pivotably connectable to the opposite lateral sides of the vehicle and being mutually connected at tops thereof by a rear cross tube; and
   lateral struts flexibly connected to corresponding ones of said front and rear struts, at positions adjacent connections of said front and rear struts to said front and rear cross tubes, respectively, said lateral struts each comprising mutually articulated front and rear lateral strut sections;
   at least one retainer provided on each of said lateral struts for locking an angular position of said strut sections thereof, wherein each of said retainers comprise a latching device means for automatically locking two strut sections at a predetermined angular position;
   means for clamping said front struts and said front cross tube to said roll bar; and
   a central cross tube connecting one of said front and rear lateral strut sections.

2. Folding top according to claim 1 including at least one retainer provided on each of said rear struts for locking an angular position of said strut sections thereof.

3. Folding top according to claim 1 wherein said latching device comprises:
   a lug having a bore on one of said two strut sections;
   a bolt mounted on another of said two strut sections; and
   means for biasing said bolt towards said one of said two strut sections, whereby said bolt may enter said bore to lock said latching device.

4. Folding top according to claim 1 wherein said means for clamping comprise:
   at least one projection on said front cross tube;
   a clamping lever articulated on said roll bar; and a tension device including a hook fixed to said clamping lever and engageable with each said projection of said front cross tube.

5. Folding top according to claim 2 wherein each said rear strut comprises:
- a lower strut section insertable in a socket of said vehicle;
- a central strut section pivotably connected to said lower strut section by means including one of said retainers, and
- an upper strut section pivotably connected to said central strut section, wherein said rear cross tube is fixed to said upper strut sections.

6. Folding top according to claim 1 wherein said front struts are positioned adjacent said roll bar.

7. Folding top according to claim 1 including a tarpaulin having a roof portion, side portions and a rear portion, and zippers connecting said tarpaulin portions.

8. Folding top according to claim 7 including means for fastening said side portions of said tarpaulin, when rolled up, to said front struts.

9. Folding top according to claim 1 including a front tarpaulin covering an area of said vehicle between said roll bar and a windshield of said vehicle, said front tarpaulin having means for connecting to said roll bar, said connecting means comprising:
- a profile strip fixed to said front tarpaulin, said profile strip being positionable against a seal element of said roll bar; and
- clamping means for clamping said profile strip to said roll bar.

10. Folding top according to claim 1, wherein each of said lateral struts comprise a single pair of lateral struts.

11. Folding top according to claim 1 wherein the dimensions of said struts are so matched to one another that in the folded-up condition of said top said lateral struts are brought near to one another in an acute angle and run approximately adjacent to a rear wall of rear seats of the vehicle while said rear cross tube lies approximately horizontal behind the rear seats and on a floor of the vehicle.

* * * * *